United States Patent
Gonnet

(10) Patent No.: US 6,352,398 B1
(45) Date of Patent: Mar. 5, 2002

(54) ATTACHMENT MEMBER FOR FIXING A PERFORATED COMPONENT TO A SUPPORT

(75) Inventor: Louis Gonnet, Saint Jean de Muzols (FR)

(73) Assignee: Societe de Prospection et d'Inventions Techniques Spit, Bourg-les-Valence (FR)

(*) Notice: Subject to any disclaimer, the term of this patent is extended or adjusted under 35 U.S.C. 154(b) by 0 days.

(21) Appl. No.: 09/707,876

(22) Filed: Nov. 8, 2000

(30) Foreign Application Priority Data

Nov. 10, 1999 (FR) .............................. 99 14131

(51) Int. Cl.[7] .......................... F16B 15/00; F16B 15/02
(52) U.S. Cl. ...................... 411/441; 411/480; 411/542; 411/544
(58) Field of Search ................... 411/440, 441, 411/149, 150, 542, 544, 480

(56) References Cited

U.S. PATENT DOCUMENTS

| | | | |
|---|---|---|---|
| 4,545,270 A | * 10/1985 | Dewey | 411/544 X |
| 5,054,983 A | * 10/1991 | Froewis et al. | 411/544 X |
| 5,620,288 A | * 4/1997 | Janssen et al. | 411/441 |
| 5,688,092 A | 11/1997 | Olivera et al. | |

FOREIGN PATENT DOCUMENTS

| | | |
|---|---|---|
| AU | 28209/67 | 10/1973 |
| DE | 43 27 436 | 12/1994 |
| EP | 0 930 442 A | 7/1999 |
| EP | 1005959 | 7/2000 |

* cited by examiner

Primary Examiner—Neill Wilson
(74) Attorney, Agent, or Firm—Lowe Hauptman Gilman & Berner, LLP

(57) ABSTRACT

The attachment member includes a bore (6) for receiving a fastener (10), a front support surface (3) intended to be placed against the component (20) to be fixed, and an extension (8) for positioning the attachment member and absorbing the shock caused by the fastener (10) striking the attachment member upon fixing.

31 Claims, 1 Drawing Sheet

ATTACHMENT MEMBER FOR FIXING A PERFORATED COMPONENT TO A SUPPORT

TECHNICAL FIELD

The invention relates to an attachment member for fixing a perforated component, including supporting means, e.g. a front surface, intended to rest upon to the component to be fixed, and means for receiving a fastener. The attachment member generally also comprises means for connection to the end of a fastener guide, or nose, of a tool.

BACKGROUND ART

In order to fix a component, such as a perforated channel, to a support, the attachment member and the nose of the tool are connected together and, once the channel is positioned against the support, the attachment member is placed against the channel, being positioned at a right angle in a hole formed in advance in the channel, then a fastener is fired from the tool. The fastener is shot forwards, traverses the attachment member and the hole in the channel and penetrates into the support, then its head comes to a stop against the base. Once the fastener is fixed, the channel is fastened between the support and the attachment member and is thus held fixedly against the support.

In order to ensure correct fixing, the attachment member is advantageously positioned correctly at a right angle in a hole in the channel, such that the central axes of the plug traversing the attachment member and the hole in the channel, respectively, substantially coincide. If it is not positioned correctly, there is a risk that the fastener will split the channel. There is moreover a risk that the channel and/or the attachment member will be split when the fastener strikes the attachment member.

SUMMARY OF THE INVENTION

This invention aims to greatly reduce the risk of splitting of the channel and/or of the attachment member upon firing the fastener.

To this end, the invention provides an attachment member for fixing a perforated component to a support, including means for receiving a fastener and supporting means intended to be rest upon the component to be fixed, characterised in that it comprises an extension for absorbing the shock caused by the fastener striking the attachment member upon fixing.

In one particular embodiment, means for positioning the attachment member are provided.

The shock-absorbing extension preferably serves as the means for positioning the attachment member in a hole in the component to be fixed.

The attachment member is thus positioned in a simple manner by introducing the shock-absorbing and positioning extension into a hole in the component to be fixed.

The shock-absorbing extension moreover preferably projects from the supporting means.

The shock-absorbing extension is advantageously compressible.

Upon firing, the shock-absorbing extension is crushed against the support by the impact of the fastener, thereby absorbing the shock.

A passage provided for the fastener preferably extends through the shock-absorbing extension.

The external cross section of the shock-absorbing extension preferably tapers towards the front.

It is therefore easier to introduce the extension into the hole. This also allows the shock-absorbing extension to be housed in the hole in the component to be fixed after being crushed.

BRIEF DESCRIPTION OF THE DRAWINGS

The invention will be more readily understood from the following description of the attachment member of the invention with reference to the accompanying drawings, in which.

DETAILED DESCRIPTION OF THE INVENTION

Figure 1:
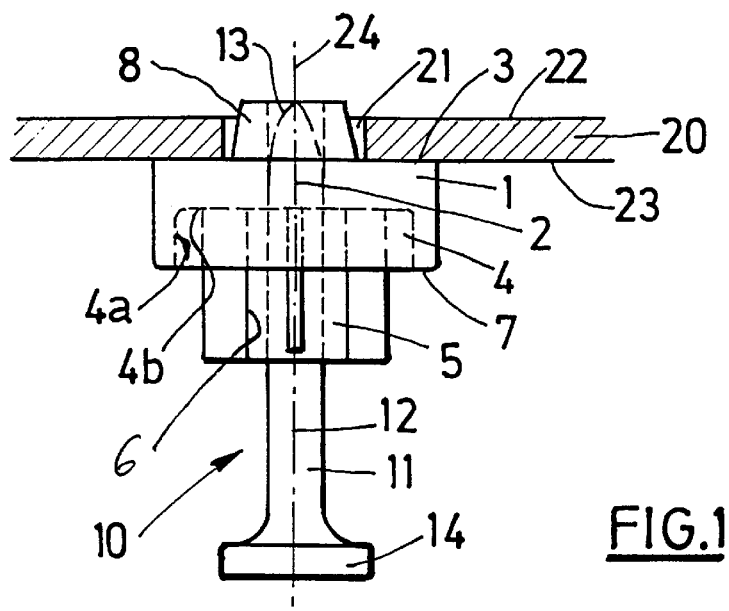
FIG. 1 is a side view of the attachment member of the invention according to one particular embodiment of the invention prior to fixing.
Figure 2:
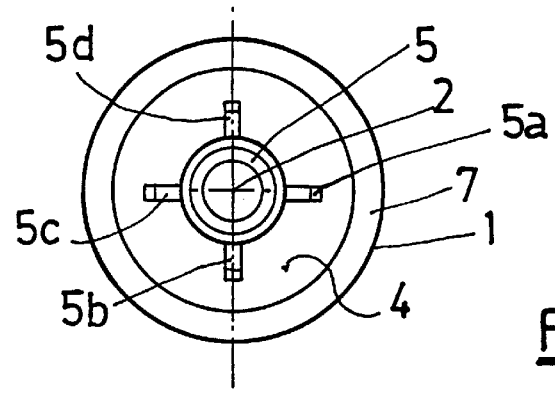
FIG. 2 is a BOTTOM view of the attachment member of FIG. 1.

The attachment member of the invention allows a perforated component to be fixed to a support. The fixing operation is effected with the aid of a tool.

It will be noted that the front designates the direction in which the fastener is shot upon firing.

The attachment member comprises a support part 1 and a sleeve 5 for receiving and guiding a fastener, or nail, 10. The support part 1 and the sleeve 5 have an axis 2.

The support part 1 has a circular external cross section. It comprises a front support surface 3 perpendicular to the axis 2 and a rear shock-absorbing cup, or dish, 4 opening to the rear surface of the support part 1.

The cup 4 comprises a generally cylindrical side wall 4a having axis 2 and a bottom 4b extending in a plane perpendicular to the axis 2.

The rear rim 7 of the cup 4 forms a stop surface for the end of the fastener guide of the tool.

The sleeve 5 projects rearwardly from the bottom 4b of the cup 4. It comprises a central bore 6 having axis 2 and defining a passage for the fastener 10. The bore 6 extends towards the front and traverses the support part 1. The sleeve 5 supports on its external surface a plurality of radial fins 5a–5d, in this case four in number, for connection to the end of the fastener guide, which extends in radial planes and are offset from one another at an angle of 90°.

The sleeve 5 and the fins 5a–5d are made of compressible material and are intended to be compressed by the impact of the head of the fastener during firing, thereby absorbing the shock caused by the fastener.

The attachment member is intended to be connected to the end of the fastener guide of a tool by introducing the sleeve 5 and the fins 5a–5d into the end of the fastener guide until this end comes to a stop against the rear rim 7 of the cup 4. When the sleeve 5 and the fins 5a–5d are introduced into the end of the fastener guide, the fins 5a–5d are forced against the inner wall of the end of the fastener guide, deflecting laterally, and thereby fixing the attachment member in the end of the fastener guide by friction. The fins 5a–5d are thus intended to guide the attachment member and to connect it to the end of the fastener guide.

The cup 4 serves as a housing for receiving the sleeve 5 compressed by the impact of the head of the fastener upon firing, and thus helps to absorb the shock caused by the fastener striking the attachment member.

The attachment member moreover comprises an extension 8 for absorbing and, in this case, positioning the attachment member. The extension 8, which has an external conical truncated shape having axis 2, projects towards the front from the support surface 3. The cross section of the extension 8 tapers towards the front. The largest cross section of the extension 8, i.e. the base of the extension 8 joined to the support surface 3, is substantially smaller than the section of the hole which received the extension. Thus, the extension 8 is introduced into the hole with a slight play. The bore 6 defining a passage for the fastener extends through the extension 8. The extension 8 is made of compressible material and its height along the axis 2 is slightly greater than the corresponding height of the hole in the component to be fixed.

The extension 8 has two functions. On one hand, it allows the attachment member to be positioned correctly by introducing the extension 8 into a fixing hole traversing the component to be fixed. On the other hand, upon firing, the extension 8 is intended to be compressed axially against the support and to be housed in the hole, thereby helextensiong to, absorb the shock caused by the fastener striking the attachment member.

The operation necessary for fixing a perforated component, in this case a channel 20, to a support 30, in this case a ceiling, with the aid of the attachment member and a fastener 10 will now be described. Fixing is effected with the aid of a tool including a fastener-guide end or "nose" adapted to receive the sleeve 5 and the fins 5a–5d.

Figure 3:
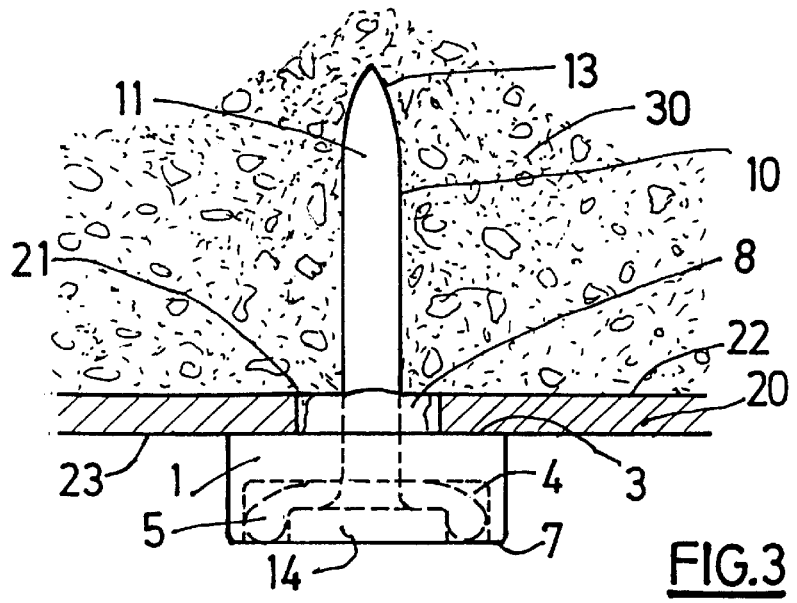
FIG. 3 is a side view of the attachment member of FIG. 1 after fixing.

The channel 20 comprises a plate including a front surface 22 intended to be attached to the support 30, a rear surface 23 and a plurality of through holes 21 having a cylindrical shape and an axis 24. Only one of these holes 21 is shown in FIGS. 1 and 3. The two front 22 and rear 23 surfaces are parallel and are perpendicular to the axes 24 of the holes 21 in the channel 20.

1—Connecting the Attachment Member and the End of the Fastener Guide

In order to connect the attachment member and the end of the fastener guide of the tool, the sleeve 5 and its fins 5a 5d are introduced into the end of the fastener guide by a relative translation movement of the attachment member and the fastener guide parallel to the axis 2 until the end of the fastener guide comes to a stop against the rear rim 7 of the cup 4.

2—Positioning the Attachment Member

The attachment member is then positioned at a right angle with a hole 21 in the channel 20 by introducing the extension 8 into the hole 21. The attachment member is then brought to bear against the channel 20 by placing its front support surface 3 against the rear surface 23 of the channel 20. In this position, the large base of the extension 8, which has a cross section substantially smaller than that of the hole 21, cooperates with the edge of the rear inlet opening of the hole 21 in order to position the attachment member laterally, such that the axis 2 of the attachment member and the axis 24 of the hole 21 substantially coincide. The extension 8 moreover projects slightly towards the front opening of the hole 21. As a result of the truncated shape of the extension 8, a hollow space remains in the interior of the hole 21, which is not occupied by the extension 8 and intended to receive the compressed extension 8, as will be described hereinafter.

The front end of the extension 8 is then brought to bear against the ceiling 30, the axes 2 and 24 in this case extending substantially vertically and the front of the attachment member being directed upwards.

3—Fixing the Attachment Member to the Support

In order to fix the attachment member to the support 30, a fastener 10 is fired with the aid of the tool.

The fastener 10 comprises a shank 11 having an axis 12, including at the front a pointed end 13 and at the rear head 14. The cross section of the shank 11 is substantially equal to that of the bore 6. On the other hand, the cross section of the head 14 is greater than that of the bore 6.

Upon firing, the fastener 10 is shot forwards. Its pointed end 13 and part of its shank 11 traverse the attachment member by passing through the bore 6 and penetrate into the support 30. The head 14 of the fastener 10 then comes to a stop against the rear end of the sleeve 5, thereby axially compressing the sleeve 5 and its fins 5a–5d as a result of the impact. Crushed, compressed elements 5, 5a–5d are then housed in the cup 4, as the head 14 of the fastener 10 stops therein. The depth of the cup 4 is thus selected to be at least equal to the sum of the height or thickness, of the head 14 of the fastener and the thickness of the central portion of sleeve 5 compressed between the bottom 4b of cup 4 and the head 14 of the fastener.

When the head 14 of the fastener 10 strikes the attachment member, the channel 20 is fixed to the ceiling 30, such that the extension 8 is crushed by axial compressive stress and is housed in the hole 21. The channel 20 then rests at the front against the ceiling 30 and ax the rear against the support surface 3 of the attachment member. In other words, the front 22 and rear 23 surfaces of the channel 20 are attached to the ceiling 30 and the support surface 3 of the attachment member respectively. Once the fastener 10 is fixed in the support 30, the channel 20 is then held fixedly against the support 30 by the attachment member.

In the preceding description, during the positioning stage, the rear face 23 of the channel 20 is brought to-bear against the front support face 3 of the attachment member, such that the extension 8 projects out of the hole 21 in the channel 20 towards the front. If the aim of the operation is to fix the channel 20 to a ceiling, the axis of the attachment member is positioned substantially vertically by directing the front of the attachment member towards the ceiling, i.e. upwards, such that the channel comes to bear against the front surface of the attachment member by gravity. If the channel is fixed to the floor or in the case of a support with an irregular surface, the base of the extension 8 could project out of the hole 21 in the component 20 to be fixed towards the rear. In all cases, the front end of the extension 8 will advantageously be brought to bear against the fixing support.

Instead of the sleeve for connecting the attachment member and the end of the fastener guide, the attachment member could comprise means for connection to the end of the fastener guide with a different structure.

In the preceding description, the shock-absorbing extension is a truncated cone of compressible material. The extension could have a different shape or structure, while still being compressible.

What is claimed is:

1. An attachment member for fixing a perforated component having a through hole to a support by means of a fastener having a shank and a head formed at an end of the shank, said attachment member comprising an integral body having a through bore formed therein to define a passage for the shank of the fastener;

said body having a first deformable portion, a substantially undeformable central portion, and a second deformable portion arranged in that order along an axial direction of said through bore;

said first deformable portion being sized to form a crushable stop for the head of the fastener, when the fastener is forced in the axial direction toward the perforated component and the support, and adapted to be axially compressed between said central portion and the head of the fastener; and said second deformable portion being sized to be insertable in the through hole of the perforated component and adapted to be axially compressed between said central portion and the support when the fastener is forcedly driven in the axial direction, whereby said attachment member functions as a dual impact-absorbing mechanism to prevent the perforated component from cracking as a result of the axial forced movement of the fastener.

2. The attachment member of claim 1, wherein said central portion is joined to said first and second deformable portions at rear and front ends thereof, respectively, and is formed as a cup opening to said rear end.

3. The attachment member of claim 2, wherein said cup is sized to completely receive the compressed first deformable portion therein.

4. The attachment member of claim 2, wherein said cup comprises a bottom and side walls extending rearwardly therefrom and ending at a rear end face of said central portion, said first deformable portion also extends rearwardly from said bottom of said cup.

5. The attachment member of claim 4, wherein said first deformable portion extends rearwardly beyond the rear end face of said central portion.

6. The attachment member of claim 1, wherein said second deformable portion is formed as a truncated cone tapering away from said central portion.

7. An assembly for fixing a perforated component having a through hole to a support, said assembly comprising:

a fastener having a shank and a head formed at an end of the shank; and an attachment member comprising a body having a through bore formed therein to define a passage for the shank of said fastener;

wherein said body has a first deformable portion, a substantially undeformable central portion, and a second deformable portion arranged in that order along an axial direction of said through bore;

said first deformable portion is sized to form a crushable stop for the head of said fastener, when the fastener is forced in the axial direction toward the perforated component and the support, and adapted to be axially compressed between said central portion and the head of said fastener; and said second deformable portion is sized to be insertable in the through hole of the perforated component and adapted to be axially compressed between said central portion and the support when said fastener is forcedly driven in the axial direction, whereby said attachment member functions as a dual impact-absorbing mechanism to prevent the perforated component from cracking as a result of the axial forced movement of said fastener.

8. The assembly of claim 7, wherein said central portion is joined to said first and second deformable portions at rear and front ends thereof, respectively, and is formed as a cup opening to said rear end.

9. The assembly of claim 8, wherein said cup is sized to completely receive the compressed first deformable portion therein.

10. The assembly of claim 8, wherein said cup comprises a bottom and side walls extending rearwardly therefrom and ending at a rear end face of said central portion, said first deformable portion also extends rearwardly from said bottom of said cup.

11. The assembly of claim 10, wherein said first deformable portion extends rearwardly beyond the rear end face of said central portion.

12. The assembly of claim 7, wherein said second deformable portion is formed as a truncated cone tapering away from said central portion.

13. The assembly of claim 9, wherein said cup is sized to completely receive both the compressed first deformable portion and the head of said fastener therein.

14. A mechanical connection, comprising a perforated component having a through hole communicating front and rear surfaces thereof;

a support for abutting the front surface of said perforated component;

a fastener having a shank and a head formed at an end of the shank; and an attachment member for abutting the rear surface of said perforated component, said attachment member comprising a body having a through bore formed therein to define a passage for the shank of said fastener;

wherein said body has a first deformable portion, a substantially undeformable central portion, and a second deformable portion arranged in that order along an axial direction of said through bore;

said first deformable portion is sized to form a crushable stop, for the head of said fastener, when said fastener is forced in the axial direction toward said attachment member, said perforated component and said support, and is axially compressed between said central portion and the head of said fastener;

said second deformable portion is inserted in the through hole of said perforated component and is compressed between said central portion and said support when said fastener is forcedly driven in the axial direction, whereby said attachment member functions as a dual impact-absorbing mechanism to prevent said perforated component from cracking as a result of the axial forced movement of said fastener.

15. The connection of claim 14, wherein said central portion is joined to said first and second deformable portions at rear and front ends thereof, respectively, and is formed as a cup opening to said rear end.

16. The connection of claim 15, wherein said cup is sized to completely receive the compressed first deformable portion therein.

17. The connection of claim 15, wherein said cup comprises a bottom and side walls extending rearwardly therefrom and ending at a rear end face of said central portion, said first deformable portion also extends rearwardly from said bottom of said cup.

18. The connection of claim 17, wherein said first deformable portion extends rearwardly beyond the rear end face of said central portion before being compressed.

19. The connection of claim 16, wherein said cup is sized to completely receive both the compressed first deformable portion and the head of said fastener therein.

20. The connection of claim 14, wherein said second before being compressed portion is formed as a truncated cone tapering away from said central portion.

21. The connection of claim 14, wherein said central portion has a front support surface which abuts the rear surface of said perforated component when said perforated component, said support and said attachment member are fixed together by said fastener, said second deformable portion extends forwardly from the front support surface of said central portion.

22. The connection of claim 21, wherein a cross section of said second deformable portion at the front support surface of said central portion is smaller than that of the through hole of said perforated component.

23. The connection of claim 21, wherein said second portion extends forwardly for a length greater than a height of the through hole of said perforated component.

24. The connection of claim 14, wherein the through hole of said perforated component is sized to completely receive the compressed second deformable portion therein.

25. The connection of claim 14, wherein, before being compressed, said second deformable portion may be placed to be entirely spaced from side walls of the through hole of said perforated component, thereby allowing room for the compressed second deformable portion to be received in the through hole.

26. A method of fixing a perforated component having a through hole to a support by means of a fastener having a shank and a head formed at an end of the shank and an attachment member having a body including a through bore formed therein to define a passage for the shank of the fastener and a first deformable portion, a substantially undeformable central portion, and a second deformable portion arranged in that order along an axial direction of the through bore, said method comprising the steps of:

inserting the second deformable portion of the attachment member in the through hole of the perforated component;

positioning the attachment member and the perforated component at a desired location on the support;

forcedly driving the fastener in the axial direction toward the attachment member, the perforated component and the support and, by the way, axially compressing the first deformable portion between the central portion and the head of the fastener and the second deformable portion between the central portion and the support, thereby absorbing shock from an impact between the fastener and the attachment member and fixing the perforated component to the support while preventing the perforated component from cracking.

27. The method of claim 26, further comprising completely receiving the compressed first deformable portion in a cup formed in the central portion of the attachment member.

28. The method of claim 27, further comprising completely receiving both the compressed first deformable portion and the head of the fastener in the cup of the central portion.

29. The method of claim 26, wherein said inserting comprises loosely inserting the second deformable portion in the through hole so that the second deformable portion is radially movable therein.

30. The method of claim 26, further comprising completely receiving the compressed second deformable portion in the through hole of the perforated component.

31. The method of claim 26, further comprising, before said forcedly driving, placing a front end of the second deformable portion against the support while allowing the perforated component to be spaced from at least one of the support and the attachment member.

* * * * *